United States Patent [19]
Okiyama

[11] Patent Number: 6,031,659
[45] Date of Patent: *Feb. 29, 2000

[54] OPTICAL AMPLIFIER FOR WAVELENGTH-DIVISION MULTIPLEXING

[75] Inventor: Tadashi Okiyama, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/754,865

[22] Filed: Nov. 22, 1996

[30] Foreign Application Priority Data

May 31, 1996 [JP] Japan .................................... 8-138244

[51] Int. Cl.[7] .................................................. H01S 3/00
[52] U.S. Cl. .......................................... 359/341; 359/134
[58] Field of Search .................... 359/341, 124, 359/134

[56] References Cited

U.S. PATENT DOCUMENTS

| | | | |
|---|---|---|---|
| 5,305,134 | 4/1994 | Tsushima et al. | 359/192 |
| 5,452,116 | 9/1995 | Kirkby et al. | 359/124 |
| 5,587,830 | 12/1996 | Chraplyvy et al. | 359/341 |
| 5,600,466 | 2/1997 | Tsushima et al. | 359/124 |
| 5,696,615 | 12/1997 | Alexander | 359/134 |

FOREIGN PATENT DOCUMENTS

| | | |
|---|---|---|
| 58-182930 | 10/1983 | Japan . |
| 2-219332 | 8/1990 | Japan . |
| 7-30520 | 1/1995 | Japan . |

*Primary Examiner*—Mark Hellner
*Attorney, Agent, or Firm*—Staas & Halsey

[57] ABSTRACT

An optical amplifier having an optical multiplexer for WDM (wavelength-division multiplexing). The optical multiplexer has a plurality of input ports and at least one output port. Optical signals having different wavelengths are respectively supplied to the input ports. A plurality of feedback loops are used to respectively control the powers of the optical signals constant. The feedback loops are respectively operatively connected to the input ports of the optical multiplexer. An optical amplifier unit is operatively connected to the output port of the optical multiplexer. The optical amplifier unit has a gain band including the wavelengths of the optical signals. By using such feedback loops, an input dynamic range for each optical signal can be widened.

56 Claims, 9 Drawing Sheets

OPTICAL AMPLIFIER FOR WAVELENGTH-DIVISION MULTIPLEXING

BACKGROUND OF THE INVENTION

1. Field of the Invention

The present invention relates generally to an optical amplifier for wavelength-division multiplexing, and more particularly to an optical amplifier suitable for a terminal for transmission.

To in crease the capacity of an optical communication system, research into wavelength-division multiplexing (WDM) has widely been pursued. For example, by combining WDM and an erbium doped fiber amplifier (EDFA), a large-capacity and long-haul optical communication system can be constructed.

2. Description of the Related Art

Conventionally known is an optical communication system including a first terminal for transmission, a second terminal for reception, and an optical fiber transmission line laid between the first and second terminals. In the case that WDM is applied to this system, the first terminal includes a plurality of optical transmitters for respectively outputting optical signals having different wavelengths and an optical multiplexer for wavelength-division multiplexing the optical signals to generate WDM signal light. The optical multiplexer has at least one output port for outputting the WDM signal light. Accordingly, the WDM signal light can be output to at least one optical fiber transmission line. In the system adopting WDM in this manner, a transmission capacity per line can be increased, thereby allowing a large capacity of the optical communication system.

In recent years, research and development on application of an optical amplifier to an optical communication system have intensively been pursued. For example, the importance of a postamplifier, optical repeater, and preamplifier each having an EDFA has become apparent.

Conventionally known is an optical amplifier including an optical amplifying medium and means for pumping the optical amplifying medium so that the optical amplifying medium has a gain band including the wavelengths of optical signals. In the case that the optical amplifying medium is an EDF (erbium doped fiber) having a first end and a second end, the pumping means includes a pump light source for outputting pump light having a proper wavelength, and means for supplying the pump light into the EDF from at least one of the first end and the second end. In the case that the optical amplifying medium is provided by a semiconductor chip, the pumping means includes means for injecting a current into the chip.

In some case, a dispersion compensator is provided in the first or second terminal or inserted in the optical fiber transmission line, so as to compensate for dispersion occurring in the optical fiber transmission line. Known examples of the dispersion compensator include a dispersion compensating fiber (DCF) having dispersion opposite to the dispersion in the optical fiber transmission line, and the combination of a fiber grating having a proper distribution of grating pitches and an optical circulator.

For example, in the case that the dispersion compensator employing the DCF is provided in the first terminal for transmission, a plurality of DCFs are respectively used for a plurality of channels of optical signals, because there is a difference in amount of dispersion compensation, that is, length of the DCF to be required between the channels of the optical signals. In this case, in configuring a postamplifier by inserting an optical amplifier between the optical multiplexer and the optical fiber transmission line, input powers to the postamplifier vary between the channels. Therefore, a wide input dynamic range is required for the optical amplifier. The variations in input powers are due to the fact that a loss per unit length of each DCF is large and the difference in length between the DCFs directly causes a difference in loss.

Further, an optical amplifier has a gain tilt in general. Therefore, in the case that there is a deviation in wavelength of each optical signal, the output power from the optical amplifier is deviated according to this deviation. For example, in an EDFA, it is known that the gain tilt occurs in a saturated region being driven by pump light having a relatively high power.

SUMMARY OF THE INVENTION

It is therefore an object of the present invention to provide an optical amplifier for WDM which has a wide input dynamic range.

It is another object of the present invention to provide an optical amplifier which can suppress the deviation in output power due to the deviation in wavelength of each optical signal.

In accordance with an aspect of the present invention, there is provided an optical amplifier having an optical multiplexer for WDM. The optical multiplexer has a plurality of input ports and at least one output port. Optical signals having different wavelengths are respectively supplied to the input ports. A plurality of feedback loops are used to respectively control the powers of the optical signals constant. The feedback loops are respectively operatively connected to the input ports of the optical multiplexer. An optical amplifier unit is operatively connected to the output port of the optical multiplexer. The optical amplifier unit has a gain band including the wavelengths of the optical signals.

Preferably, each feedback loop includes an optical attenuator having variable attenuation for receiving the corresponding optical signal, an optical circuit for branching output light from the optical attenuator into first branch light and second branch light, a photodetector for receiving the first branch light, and a circuit for controlling the attenuation of the optical attenuator so that the power of the first branch light is maintained constant. In this case, the second branch light is supplied to the corresponding input port of the optical multiplexer.

In the present invention, by using the plural feedback loops, an input dynamic range for each optical signal can be widened.

Preferably, an optical filter having such characteristics as to cancel wavelength characteristics of a gain of the optical amplifier unit is adopted to thereby compensate for variations in power with variations in wavelengths of the optical signals.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the attached drawings.

Figure 1:
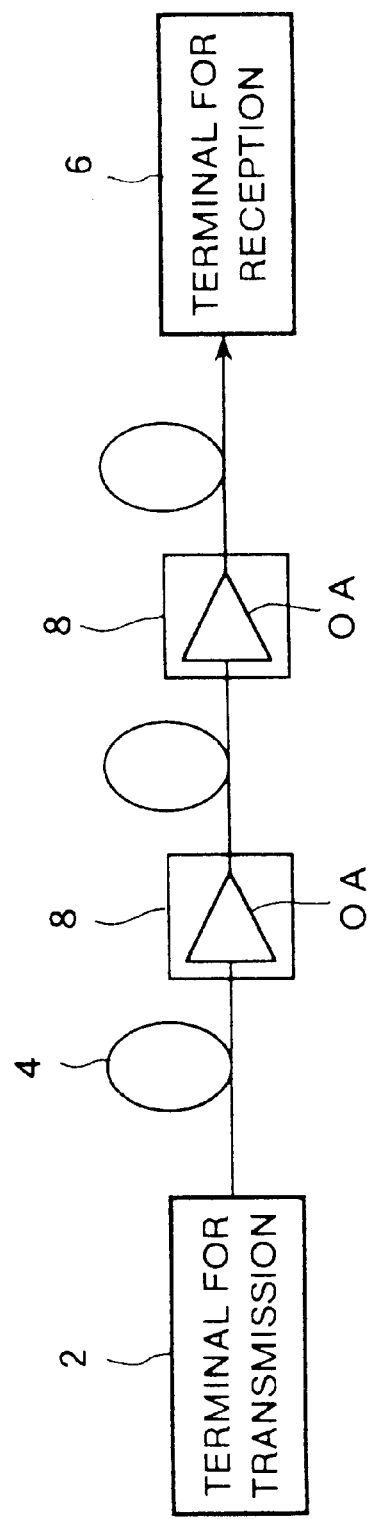
FIG. 1 is a block diagram of an optical communication system to which the present invention is applicable.

Referring to FIG. 1, there is shown an optical communication system to which the present invention is applicable. This system includes a terminal 2 for outputting a WDM signal light, an optical fiber transmission line 4 for transmitting the WDM signal light, and a terminal 6 for receiving the WDM signal light transmitted. In the case that the optical fiber transmission line 4 is laid over a long distance, one or more optical repeaters 8 each having an optical amplifier OA are inserted in the optical fiber transmission line 4.

Figure 2:
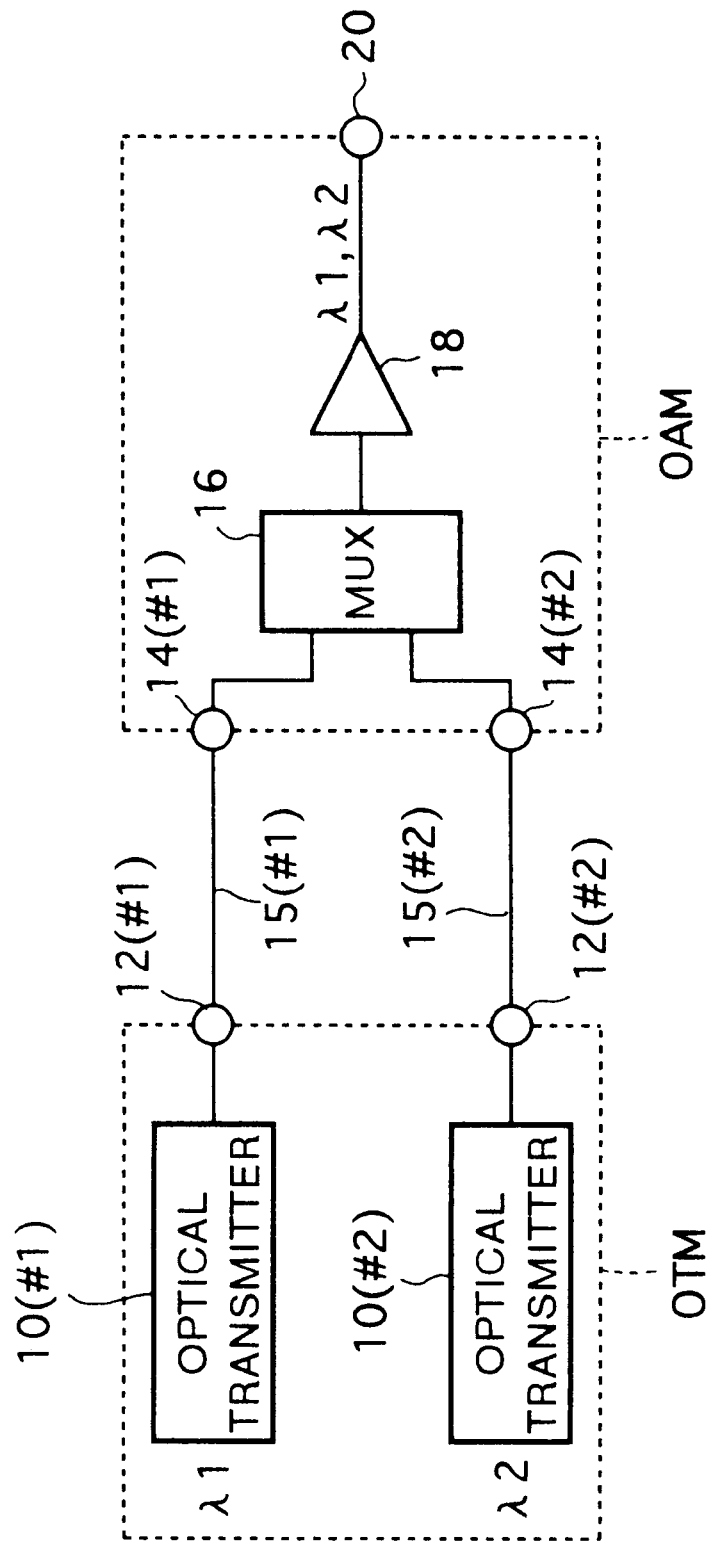
FIG. 2 is a block diagram showing a basic configuration of a terminal for transmission.

Referring to FIG. 2, there is shown a basic configuration of the terminal for transmission. This terminal includes an optical transmitter module OTM for outputting optical signals in a plurality of channels and an optical amplifier module OAM operatively connected to the optical transmitter module OTM.

In this specification, the wording that an element and another element are operatively connected includes the case that these elements are directly connected, and also includes the case that these elements are so provided as to be related with each other to such an extent that an electrical signal or an optical signal can be mutually transferred between these elements.

The optical transmitter module OTM has an optical transmitter 10 (#1) for generating an optical signal having a wavelength λ1 in a first channel (CH1) and an optical transmitter 10 (#2) for generating an optical signal having a wavelength λ2 in a second channel (CH2). The optical signal in the CH1 is output from an optical connector 12 (#1), and the optical signal in the CH2 is output from an optical connector 12 (#2). The optical amplifier module OAM has an optical connector 14 (#1) for receiving the optical signal in the CH1 and an optical connector 14 (#2) for receiving the optical signal in the CH2. The optical connectors 12 (#1) and 14 (#1) are connected by an optical fiber 15 (#1), and the optical connectors 12 (#2) and 14 (#2) are connected by an optical fiber 15 (#2). The optical signals in the CH1 and the CH2 are wavelength-division multiplexed in an optical multiplexer (MUX) 16. An WDM signal light obtained as the result of the wavelength-division multiplexing is amplified in an optical amplifier unit 18, and amplified WDM signal light is output from an optical connector 20. The optical connector 20 is connected to the optical fiber transmission line 4 shown in FIG. 1, for example.

Figure 3:
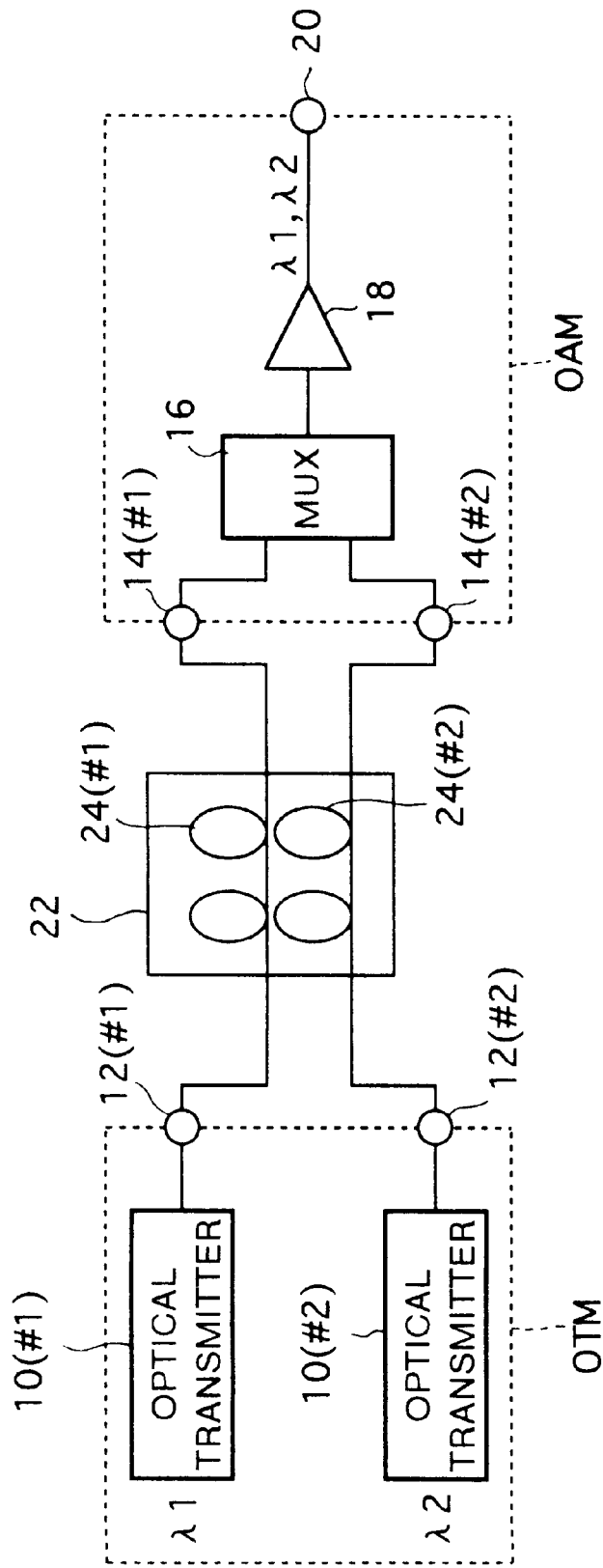
FIG. 3 is a block diagram showing another basic configuration of the terminal for transmission.

Referring to FIG. 3, there is shown another basic configuration of the terminal for transmission. A dispersion compensator 22 is connected between the optical transmitter module OTM and the optical amplifier module OAM. The dispersion compensator 22 has a DCF (dispersion compensating fiber) 24 (#1) connected between the optical connectors 12 (#1) and 14 (#1) and a DCF 24 (#2) connected between the optical connectors 12 (#2) and 14 (#2).

In the case that the optical amplifier unit 18 has a gain tilt, a change in wavelength λ1 of the optical signal in the CH1 due to any causes in operation of the optical transmitter 10 (#1) causes a change in power of light to be output from the optical amplifier unit 18 in accordance with the gain tilt. It is preferable that such a deviation in light power is as small as possible.

The reason of use of the dispersion compensator 22 in the terminal shown in FIG. 3 is to preliminarily compensate for a group delay that may be incurred to the optical signal in the CH1, for example, in the optical fiber transmission line 4 (see FIG. 1), on the transmission side. Accordingly, if this compensation is entirely carried out by the dispersion compensator 22, the length of the DCF 24 (#1) is set so that the DCF 24 (#1) cancels chromatic dispersion (wavelength dispersion) occurring in the optical fiber transmission line 4. Since the optical fiber transmission line 4 is common to the optical signals in the CH1 and the CH2, the lengths of the DCFs 24 (#1 and #2) are different according to the wavelengths λ1 and λ2. In general, a loss per unit length of a DCF is larger than a loss per unit length of a fiber used as an optical fiber transmission line. Accordingly, if the lengths of the DCFs 24 (#1 and #2) are different, the powers of the optical signals in the CH1 and the CH2 to be supplied to the optical amplifier module OAM become different even though the output powers from the optical transmitters 10 (#1 and #2) are equal to each other. For such a reason, a wide input dynamic range is required in the optical amplifier unit 18.

Figure 4:
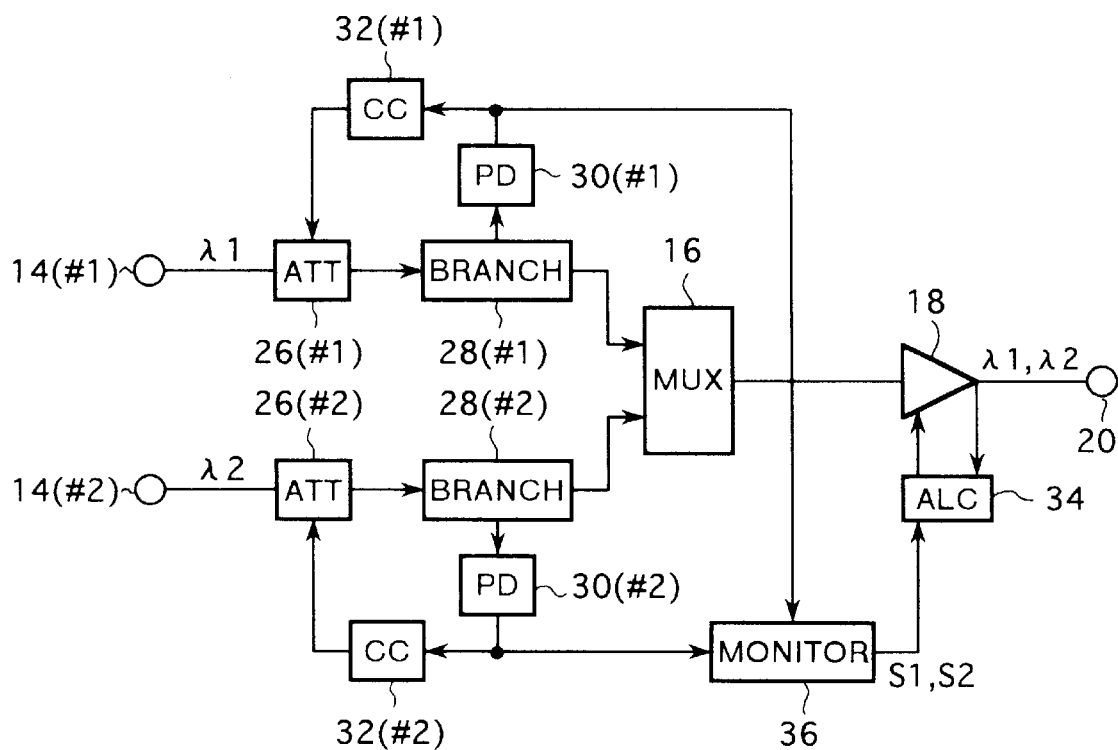
FIG. 4 is a block diagram showing a first preferred embodiment of an optical amplifier module according to the present invention.

Referring to FIG. 4, there is shown a first preferred embodiment of the optical amplifier module according to the present invention. An optical attenuator (ATT) 26 (#1) is provided to give variable attenuation to the optical signal (wavelength λ1) in the CH1 supplied to the optical connector 14 (#1). An optical output from the optical attenuator 26 (#1) is branched into first branch light and second branch light by an optical branching circuit 28 (#1). The ratio in power between the first branch light and the second branch light is set to 1:20, for example. The first branch light is supplied to a photodetector 30 (#1), and the second branch light is supplied to one of a plurality of input ports of the optical multiplexer 16. The photodetector 30 (#1) outputs an electrical signal having a level corresponding to the power of the first branch light.

A control circuit (CC) 32 (#1) is operatively connected to the photodetector 30 (#1) and the attenuator 26 (#1). The control circuit 32 (#1) controls attenuation in the attenuator 26 (#1) so that the level of the electrical signal output from the photodetector 30 (#1) is maintained constant. The attenuator 26 (#1) may be configured by, for example, a magneto-optical crystal of YIG (yttrium iron garnet) transmitting an optical signal, a polarizer acting on the light transmitted through the crystal, a coil for applying a magnetic field to the crystal, and a circuit for passing a variable current through the coil. As the optical branching circuit 28 (#1), a fiber-fusion type optical coupler or a device employing a dielectric multilayer film may be adopted. The photodetector 30 (#1) may be configured by, for example, a photodiode, a circuit for applying a reverse bias voltage to the photodiode, and a circuit for detecting a current flowing in the photodiode.

Like in the CH1, an optical attenuator 26 (#2), an optical branching circuit 28 (#2), a photodetector 30 (#2), and a control circuit 32 (#2) are provided to control attenuation to the optical signal (wavelength λ2) in the CH2 supplied to the optical connector 14 (#2).

An automatic level control (ALC) loop 34 for controlling the gain of the optical amplifier unit 18 is provided to make the optical output power from the optical amplifier unit 18 coincide with a predetermined target. A monitor 36 operatively connected to the photodetectors 30 (#1 and #2) is provided to monitor channel information of the optical signals. The monitor 36 detects the number of channels of the optical signals supplied to this optical amplifier module according to the electrical signals from the photodetectors 30 (#1 and #2) and transmits a monitor signal relating to the number of channels detected above to the ALC loop 34. The monitor signal includes a first monitor signal Si indicating that the detected number of channels has become zero, i.e., all the channels have been cut off, and a second monitor signal S2 indicating the detected number of channels.

In this preferred embodiment, a feedback loop including the optical attenuator operating independently to each optical signal is provided per channel, so that an input dynamic range per channel can be widened.

Figure 5:
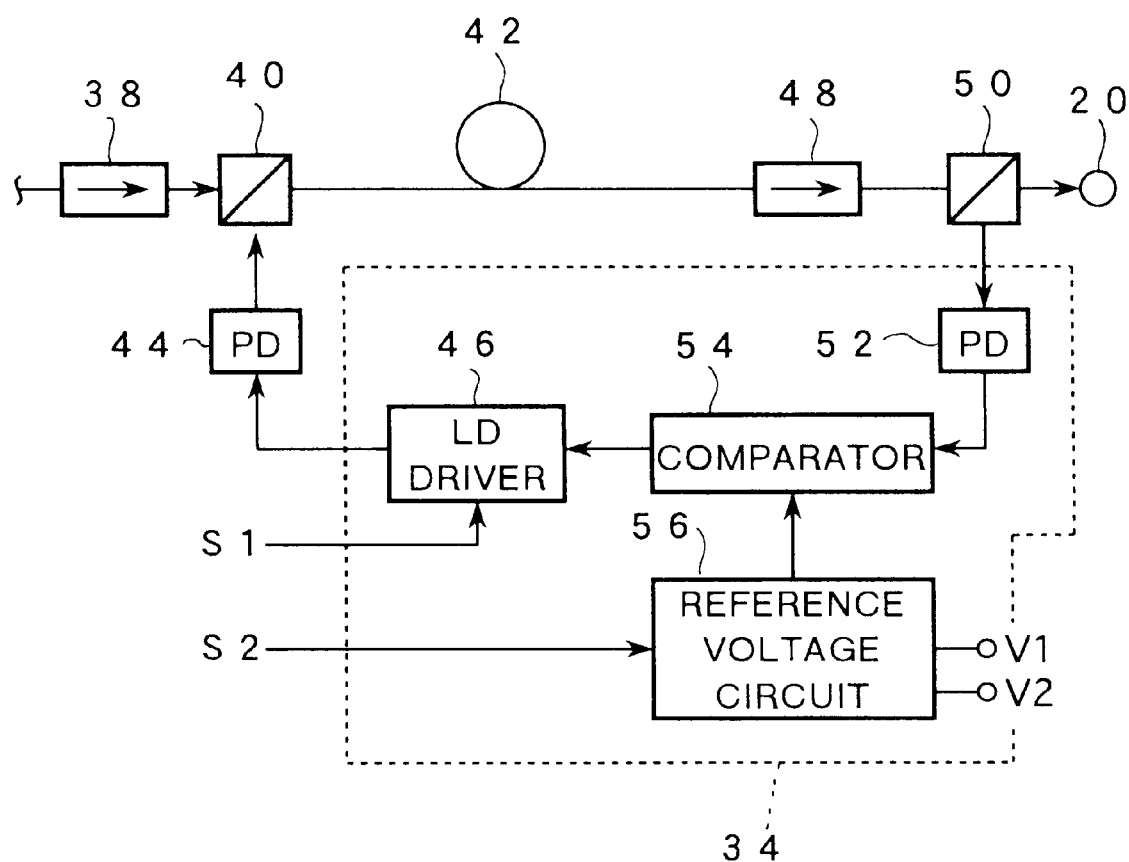
FIG. 5 is a block diagram showing a specific embodiment of an optical amplifier unit and an ALC (automatic level control) loop.

Referring to FIG. 5, there is shown a specific embodiment of the optical amplifier unit 18 and the ALC loop 34 shown in FIG. 4. The WDM optical signal from the optical multiplexer 16 (see FIG. 4) is supplied through an optical isolator 38 and an optical coupler 40 to a first end of a doped fiber 42 as the optical amplifying medium. Pump light from a laser diode 44 as the pump light source is supplied through the optical coupler 40 to the first end of the doped fiber 42. The dopant in the doped fiber 42 is a rare earth element (including its compounds or ions). In the case that the wavelengths of the WDM optical signal fall within a band of 1.55 μm, erbium (Er) is suitable as the dopant. In this case, the wavelength of the pump light is promisingly a band of 0.98 μcm or 1.48 μm. When the WDM signal light passes the doped fiber 42 being pumped by the pump light, the WDM signal light is amplified in the doped fiber 42, and the resultant amplified WDM signal light is output from a second end of the doped fiber 42. The amplified WDM signal light is transmitted through an optical isolator 48, an optical coupler 50, and an optical connector 20 in this order, and next output from the optical connector 20 to the optical fiber transmission line 4 (see FIG. 1).

The optical coupler 50 extracts monitor light to be used for monitoring of the power of the amplified WDM signal light output from the doped fiber 42. The extracted monitor light is converted into an electrical signal (voltage signal) having a level corresponding to the power of the monitor light by a photodetector 52. The voltage signal from the photodetector 52 is compared with a reference voltage V1 or V2 in a comparator 54, and an error signal obtained as the result of this comparison is supplied to an LD driver 46.

The LD driver 46 performs the following two kinds of control on a bias current to be supplied to the laser diode 44. First, the LD driver 46 feedback-controls the bias current to be supplied to the laser diode 44 so that the error signal supplied from the comparator 54 becomes zero or constant. Secondly, the LD driver 46 receives the monitor signal S1 from the monitor 36 (see FIG. 4) and reduces or nullifies the bias current to be supplied to the laser diode 44 when all the input channels have been cut off, whereby the pumping of the doped fiber 42 is stopped. The reason why the pumping is stopped when all the input channels have been cut off is to eliminate a possibility that unless the pumping is stopped, the power of the pump light may become abnormally high when all the input channels have been cut off, which may cause excess output power upon restarting of input of optical signals in the case that the time constant of the ALC loop is relatively large, resulting in adverse effects on a downstream optical circuit.

A reference voltage circuit 56 is provided to select the reference voltage V1 or V2 to be supplied to the comparator 54. The circuit 56 receives the monitor signal S2 indicating the detected number of channels from the monitor 36 (see FIG. 4), and selectively supplies the reference voltage V1 or V2 to the comparator 54 according to the detected number of channels (one or two in this preferred embodiment). The reference voltages V1 and V2 are set so that the output power in each channel is maintained constant irrespective of the number of channels of input optical signals. Although the total output light power cannot be maintained constant, the output power in each channel can be maintained constant by thus selecting the gain of the optical amplifier unit according to the number of input channels.

Figure 6:
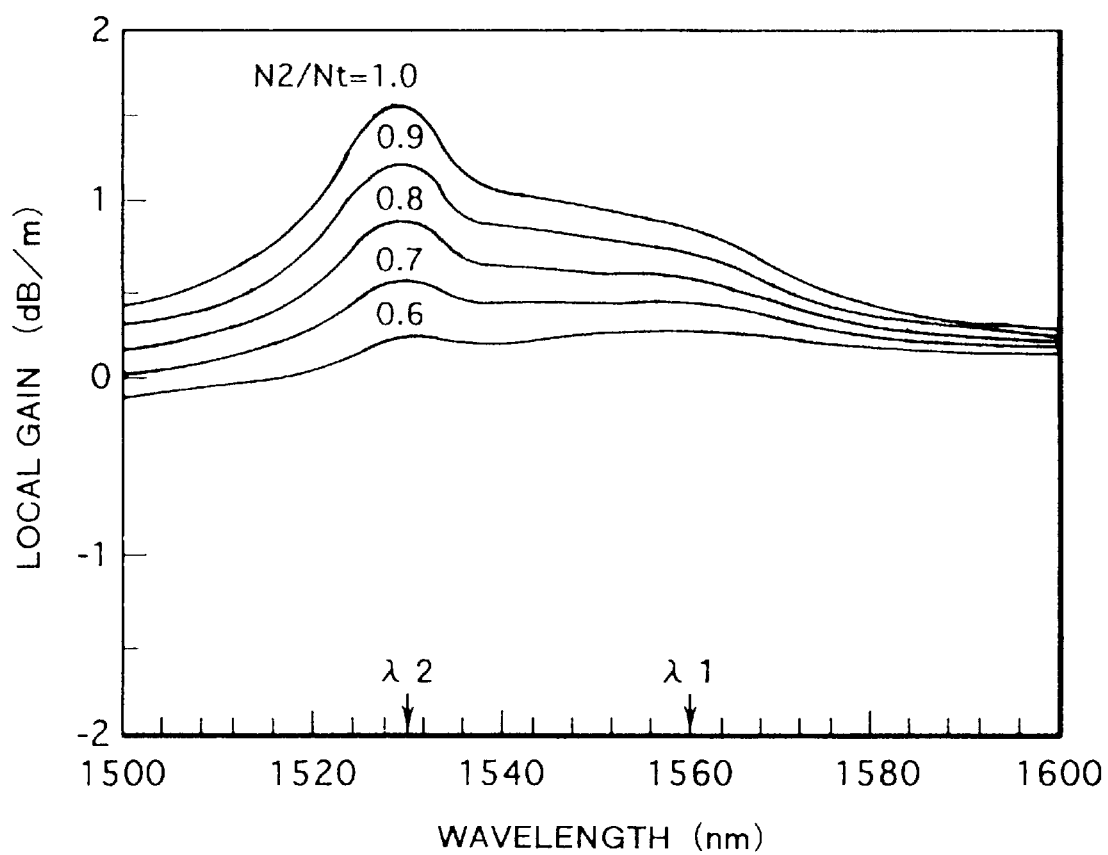
FIG. 6 is a graph showing an example of gain characteristics of an EDFA (erbium doped fiber amplifier)

Referring to FIG. 6, there is shown an example of gain characteristics of an EDFA (erbium doped fiber amplifier). In FIG. 6, the vertical axis represents local gain (dB/m), and the horizontal axis represents wavelength (nm). It is understood from FIG. 6 that wavelength characteristics (wavelength dependence) of gain changes according to a population inversion condition. A parameter N2/Nt representing the population inversion condition is given as a ratio in number of Er ions in the population inversion condition to all the Er ions. In the case of N2/Nt=1.0, all the Er ions have made an upward transition to a high energy level to obtain complete population inversion. With a change in N2/Nt, the gain characteristics change continuously. For example, N2/Nt increases with an increase in power of the pump light, and decreases with an increase in total power of the input optical signals. In this manner, the gain characteristics of the EDFA depends on the power of the pump light and/or the total power of the input optical signal. Accordingly, an excellent balance between the pump light power and the input light power is required to make flat the gain tilt in a gain band.

In this specification, the term of "gain band" is defined as a band where gain occurs in the optical amplifier. In the example shown in FIG. 6, the gain band is a band where the local gain assumes positive values.

In the optical amplifier unit shown in FIG. 5, the power of the pump light is controlled in the ALC loop 34. Accordingly, the power of each input optical signal is properly set, so as to make the flat the gain tilt in the gain band. This will now be described more specifically.

Figure 7:
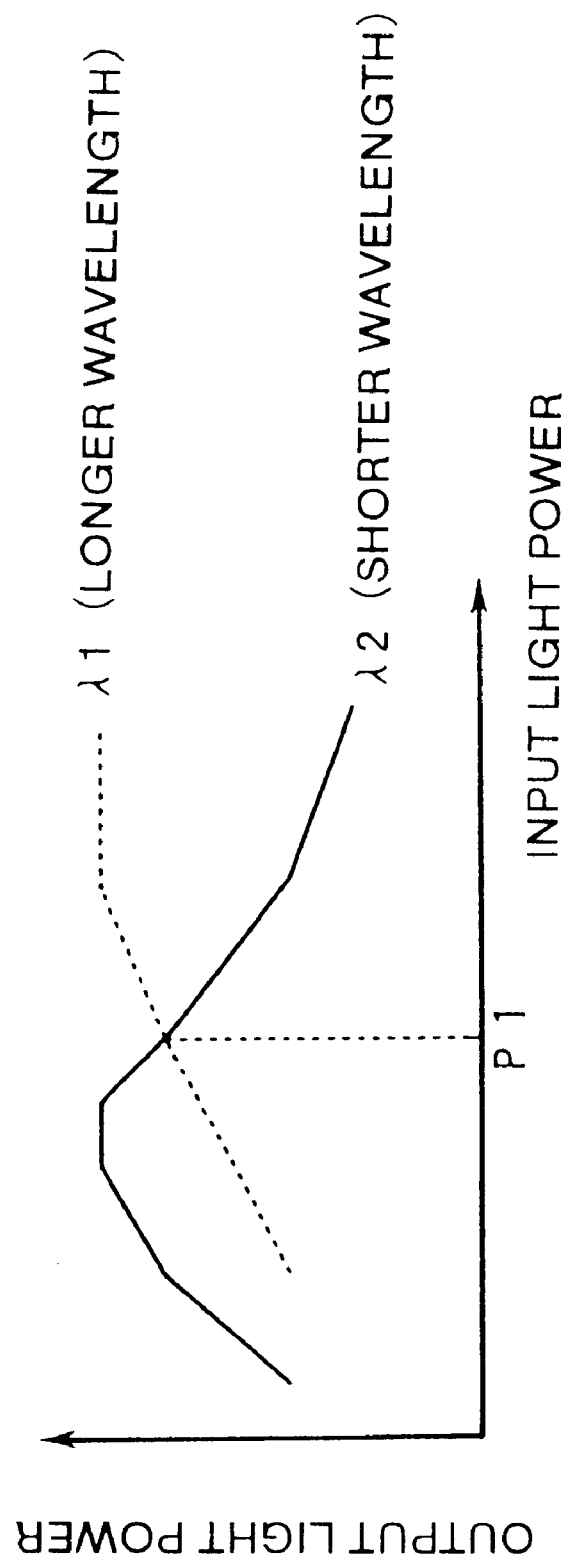
FIG. 7 is a graph showing the relation between output light power and input total light power of the optical amplifier unit.

FIG. 7 is a graph showing the relation between output light power and input total light power of the optical amplifier unit 18 in the first preferred embodiment shown in FIG. 4. There is shown a manner of change in the output light power with an increase in total power of the input optical signals in the CH1 (wavelength λ1) and the CH2 (wavelength λ2). It is assumed that the optical amplifier unit 18 has the gain characteristics shown in FIG. 6 and that the wavelengths λ1 and λ2 are 1560 nm and 1530 nm, respectively. In this case, as apparent from FIG. 6, the local gain for the optical signal having the wavelength λ1 responds relatively insensitively to the change in the total input power, whereas the local gain for the optical signal having the wavelength λ2 responds relatively sensitively to the change in the total input power. As a result, the output power of the optical signal having the wavelength λ1 increases monotonously with an increase in the total input power until reaching a saturated value, whereas the output power of the optical signal having the wavelength λ2 increases with an increase in the total input power until the total input power reaches a certain value, and decreases with an increase in the total input power after the total input power exceeds the certain value.

In the first preferred embodiment shown in FIG. 4, an input light power P1 making the output light powers in the CH1 and the CH2 equal to each other is set. That is, a first target of the power of the optical signal in the CH1 in the feedback loop including the optical attenuator 26 (#1) and a second target of the power of the optical signal in the CH2 in the feedback loop including the optical attenuator 26 (#2) are set so that the gain of the optical amplifier unit 18 at the wavelength λ1 becomes equal to that at the wavelength λ2. Accordingly, the gain tilt in the gain band can be made flat. For example, in the gain characteristics shown in FIG. 6, the gain tilt is flat in the vicinity of N2/Nt=0.7.

In the optical amplifier unit shown in FIG. 5, the pump light from the laser diode 44 is supplied into the doped fiber 42 from its first end, so that the optical signals and the pump light propagate in the same direction in the doped fiber 42. That is, forward pumping is adopted. Alternatively, the pump light source may be operatively connected to the second end of the doped fiber 42 so that the optical signals and the pump light propagate in opposite directions in the doped fiber 42 (backward pumping). Further, bidirectional pumping as a combination of forward pumping and backward pumping may also be adopted.

Figure 8:
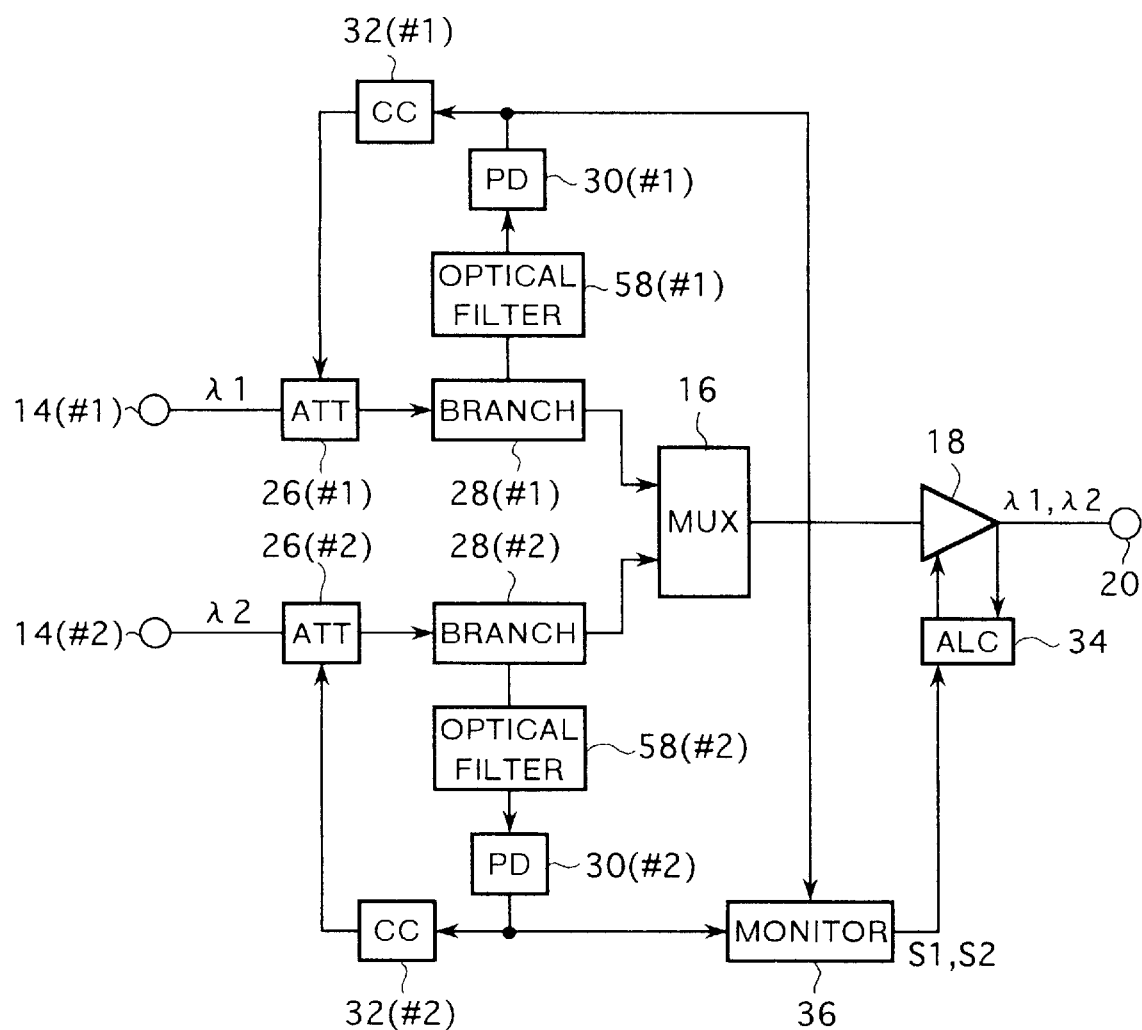
FIG. 8 is a block diagram showing a second preferred embodiment of the optical amplifier module according to the present invention.

Referring to FIG. 8, there is shown a second preferred embodiment of the optical amplifier module according to the present invention. In the feedback loop including the optical attenuator 26 (#1), an optical filter 58 (#1) is operatively connected between the optical branching circuit 28 (#1) and the photodetector 30 (#1). The optical filter 58 (#1) has such characteristics as to cancel the wavelength characteristics of the gain of the optical amplifier unit 18 in the vicinity of the wavelength λ1. Accordingly, variations in the power with variations in the wavelength of the optical signal in the CH1 can be compensated. Also in the feedback loop including the optical attenuator 26 (#2), an optical filter 58 (#2) is operatively connected between the optical branching circuit 28 (#2) and the photodetector 30 (#2). The optical filter 58 (#2) has such characteristics as to cancel the wavelength characteristics of the gain of the optical amplifier unit 18 in the vicinity of the wavelength λ2. Accordingly, variations in the power with variations in the wavelength of the optical signal in the CH2 can be compensated.

Figure 9:
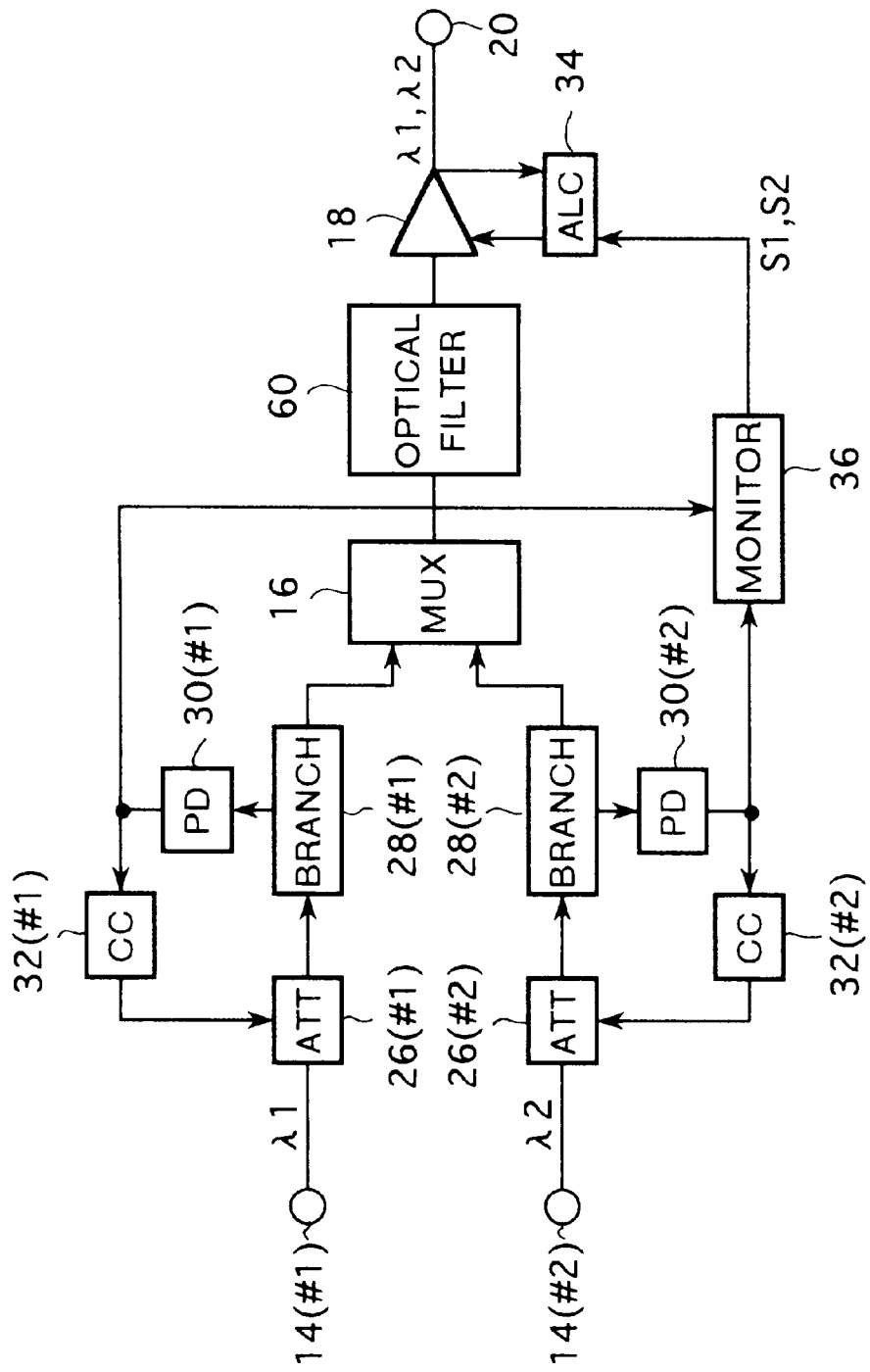
FIG. 9 is a block diagram showing a third preferred embodiment of the optical amplifier module according to the present invention.

Referring to FIG. 9, there is shown a third preferred embodiment of the optical amplifier module according to the present invention. An optical filter 60 is operatively connected between the output port of the optical multiplexer 16 and the optical amplifier unit 18. The optical filter 60 has such characteristics as to cancel the wavelength characteristics of the gain of the optical amplifier unit 18. More specifically, in the case that the gain characteristics shown in FIG. 6 are univocally determined according to pump light power and total input power, an optical filter having characteristics opposite to the above characteristics is used as the optical filter 60. For light having an arbitrary wavelength, the product of the transmittance of the optical filter 60 and the gain of the optical amplifier unit 18 is substantially constant. By using the optical filter 60, variations in the power with variations in the wavelength of the optical signal in each channel can be compensated. Further, in the case of changing the wavelength of the optical signal in each channel, there is no possibility of change in the power with the change in the wavelength.

Having thus described some specific embodiments of the present invention, it is to be noted that the present invention is not limited to these embodiments. For instance, although the number of channels of the input optical signals has been set to two in the above preferred embodiments, the number of channels may be set to three or more. In this case, it is sufficient that the above-mentioned specific control for making the gain tilt flat is to be performed by using any two channels selected from all the channels. For example, the two channels selected are a shortest wavelength channel and a longest wavelength channel. Further, an optical amplifier unit employing a semiconductor chip may be adopted. In this case, the gain of the optical amplifier may be controlled by a current to be injected into the semiconductor chip. Further, a fiber not containing a dopant of a rare earth element may be used as the optical amplifying medium. This fiber is optically pumped, and optically amplifies optical signals according to a nonlinear effect such as four-wave mixing (FWM). Thus, the preferred embodiments described in this specification are merely illustrative and not limitative. The scope of the invention is defined by the appended claims and all changes and modifications as fall within the equivalence of the scope of the claims are therefore to be embraced by the invention.

What is claimed is:

1. An optical amplifier comprising:

an optical multiplexer for wavelength-division multiplexing, having a plurality of input ports and at least one output port, said input ports respectively being supplied with optical signals having different wavelengths;

a plurality of feedback loops respectively operatively connected to said input ports, for controlling powers of said respective optical signals to be constant; and an optical amplifier unit operatively connected to said output port and having a gain band including said wavelengths of said optical signals, wherein each feedback loop controls the power of the optical signal supplied to the input port operatively connected to the feedback loop in accordance with a portion of the optical signal branched therefrom before the optical signal is supplied to the input port.

2. An optical amplifier according to claim 1, wherein each of said feedback loops comprises:

an optical attenuator having variable attenuation, for receiving said corresponding optical signal;

a means for branching output light from said optical attenuator into a first branch light and a second branch light;

a photodetector for receiving said first branch light and outputting an electrical signal having a level corresponding to a power of said first branch light; and a means operatively connected to said photodetector and said optical attenuator for controlling said attenuation of said optical attenuator so that said level of said electrical signal is maintained constant;

said second branch light being supplied to said corresponding input port of said optical multiplexer.

3. An optical amplifier according to claim 2, wherein:

each of said feedback loops further comprises an optical filter operatively connected between said branching means and said photodetector and having such characteristics as to cancel wavelength characteristics of a gain of said optical amplifier unit in the vicinity of said wavelength of said corresponding optical signal;

whereby variations in power with variations in said wavelength of said corresponding optical signal are compensated.

4. An optical amplifier according to claim 2, further comprising:

an automatic level control (ALC) loop comprising a means for controlling a gain of said optical amplifier unit so that an optical output power from said optical amplifier unit coincides with a predetermined target.

5. An optical amplifier according to claim 4, further comprising:

a means for detecting the number of channels of said optical signals according to said electrical signal output from said photodetector of each feedback loop;

wherein said ALC loop further comprises a means for selecting said gain of said optical amplifier unit according to the number of channels detected by said detecting means;

whereby an output power in each channel is maintained constant.

6. An optical amplifier according to claim 5, wherein:

said optical amplifier unit comprises an optical amplifying medium and a means for pumping said optical amplifying medium so that said optical amplifying medium has said gain band; and said optical amplifier further comprises a means for stopping pumping of said optical amplifying medium when said detected number of channels becomes zero.

7. An optical amplifier according to claim 1, wherein:

a target of said power of said corresponding optical signal in each feedback loop is set so that a gain tilt in said gain band becomes flat.

8. An optical amplifier according to claim 7, wherein:

said optical signals comprise a first optical signal having a first wavelength, and a second optical signal having a second wavelength;

said feedback loops comprise a first loop for making a power of said first optical signal coincide with a first target, and a second loop for making a power of said second optical signal coincide with a second target; and said first and second targets are set so that gains of said optical amplifier unit at said first and second wavelengths become equal to each other.

9. An optical amplifier according to claim 1, wherein said optical amplifier unit comprises:

a doped fiber doped with a rare earth element, having a first end and a second end, said first end being operatively connected to said output port of said optical multiplexer;

a pump light source for outputting pump light having a wavelength decided so that said doped fiber has said gain band; and a means operatively connected to said pump light source and said doped fiber for supplying said pump light into said doped fiber from at least one of said first end and said second end.

10. An optical amplifier according to claim 9, wherein:

said gain band includes 1.55 μm; and said rare earth element is erbium (Er).

11. An optical amplifier according to claim 1, further comprising:

a plurality of optical transmitters respectively operatively connected to said input ports of said optical multiplexer.

12. An optical amplifier according to claim 11, further comprising:

an optical fiber transmission line operatively connected to said optical amplifier unit; and a dispersion compensator for compensating for dispersion occurring in said optical fiber transmission line.

13. An optical amplifier according to claim 12, wherein:

said dispersion compensator comprises a plurality of dispersion compensating fibers respectively operatively connected between said optical transmitters and said input ports of said optical multiplexer.

14. An optical amplifier according to claim 1, further comprising:

an optical filter operatively connected between said output port of said optical multiplexer and said optical amplifier unit;

said optical filter having such characteristics as to cancel wavelength characteristics of a gain of said optical amplifier unit in said gain band;

whereby variations in power with variations in said wavelength of each of said optical signals are compensated.

15. An optical amplifier according to claim 1, wherein each of said feedback loops includes an optical attenuator attenuating the corresponding optical signal.

16. An apparatus comprising:

a plurality of feedback loops corresponding, respectively, to a plurality of optical signals having different wavelengths, each feedback loop controlling the power level of the corresponding optical signal to be constant;

an optical multiplexer combining the plurality of power level controlled optical signals into a wavelength division multiplexed (WDM) signal; and an optical amplifier amplifying the WDM signal, wherein each feedback loop controls the power level of the corresponding optical signal in accordance with a portion of the optical signal branched therefrom before the optical signal is combined by the optical multiplexer.

17. An apparatus according to claim 16, wherein each feedback loop comprises:

an optical attenuator attenuating the corresponding optical signal and having a variable attenuation;

a branching device branching a portion of the attenuated optical signal;

a detector receiving the branched portion and producing an electrical signal corresponding to the power level of the branched portion; and a controller controlling the variable attenuation of the optical attenuator in accordance with the electrical signal produced by the detector, to maintain the power level of the optical signal to be constant.

18. An apparatus according to claim 17, wherein each feedback loops further comprises:

an optical filter cancelling wavelength characteristics of the gain of the optical amplifier in the vicinity of the wavelength of the corresponding optical signal, to compensate for variations in the wavelength of the optical signal.

19. An apparatus according to claim 17, further comprising:
an automatic level control (ALC) loop controlling the gain of the optical amplifier so that the optical output power of the optical amplifier coincides with a predetermined target.

20. An apparatus according to claim 19, further comprising:
a detection device detecting the number of optical signals multiplexed into the WDM signal, wherein the ALC loop controls the gain of the optical amplifier in accordance with the number of optical signals detected by the detection device.

21. An apparatus according to claim 20, wherein:
the optical amplifier comprises an optical amplifying medium and a pump source pumping the optical amplifying medium, and
the apparatus further comprises a pumping controller stopping pumping of the optical amplifying medium when the detected number of channels becomes zero.

22. An apparatus according to claim 16, wherein each feedback loop controls the power level of the corresponding output signal so that a tilt gain of the optical amplifier becomes flat.

23. An apparatus according to claim 22, wherein:
the plurality of optical signals comprise a first optical signal having a first wavelength, and a second optical signal having a second wavelength,
the feedback loops comprise a first loop controlling the power level of the first optical signal to coincide with a first target, and a second loop controlling the power level of the second optical signal to coincide with a second target, and
the first and second targets are set so that the gain of the optical amplifier at the first wavelength becomes equal to the gain of the optical amplifier at the second wavelength.

24. An apparatus according to claim 16, wherein the optical amplifier comprises:
a doped fiber doped with a rare earth element, the doped fiber having a first end and a second end, the first end receiving the WDM signal; and
a pump light source providing pump light to the doped fiber through at least one of the group consisting of the first end and the second end of the doped fiber.

25. An apparatus according to claim 24, wherein the optical amplifier has a gain band which includes 1.55 $\mu$m, and the rare earth element is erbium (Er).

26. An apparatus according to claim 16, further comprising:
a plurality of optical transmitters producing the plurality of optical signals, respectively.

27. An apparatus according to claim 26, further comprising:
an optical fiber transmission line receiving the amplified WDM signal from the optical amplifier; and
a dispersion compensator compensating for dispersion occurring in the optical fiber transmission line.

28. An apparatus according to claim 27, wherein:
the dispersion compensator comprises a plurality of dispersion compensating fibers corresponding, respectively, to the plurality of optical signals, each dispersion compensating fiber compensating for dispersion affecting the corresponding optical signal.

29. An apparatus according to claim 16, further comprising:
an optical filter cancelling wavelength characteristics of the gain of the optical amplifier, to compensate for variations in power due to variations in wavelengths of the optical signals.

30. An optical amplifier according to claim 16, wherein each of the feedback loops includes an optical attenuator attenuating the corresponding optical signal.

31. An apparatus comprising:
means for controlling the power levels of a plurality of optical signals in accordance with feedback from the plurality of optical signals so that each optical signal has a constant power level;
means for combining the plurality of power level controlled optical signals into a wavelength division multiplexed (WDM) signal; and
means for amplifying the WDM signal, wherein said means for controlling controls the power levels in accordance with feedback branched from the optical signals before being combined by the means for combining.

32. A method comprising the steps of:
controlling the power levels of a plurality of optical signals in accordance with feedback from the plurality of optical signals so that each optical signal has a constant power level;
combining the plurality of power level controlled optical signals into a wavelength division multiplexed (WDM) signal; and
amplifying the WDM signal, wherein said controlling controls the power levels in accordance with feedback branched from the optical signals before being combined into the WDM signal.

33. An apparatus comprising:
an optical multiplexer combining a plurality of optical signals having different wavelengths into a wavelength division multiplexed (WDM) signal;
an optical amplifier amplifying the WDM signal; and
a plurality of feedback loops corresponding, respectively, to the plurality of optical signals, each feedback loop controlling the power level of the corresponding optical signal in accordance with an amplification characteristic of the optical amplifier and in accordance with a portion of the optical signal branched therefrom before the optical signal is combined by the optical multiplexer.

34. An apparatus according to claim 33, wherein each feedback loop comprises:
an optical attenuator attenuating the corresponding optical signal and having a variable attenuation;
a branch device branching a portion of the attenuated optical signal;
a detector receiving the branched portion and producing an electrical signal corresponding to the power level of the branched portion; and
a controller controlling the variable attenuation of the optical attenuator in accordance with the electrical signal produced by the detector, to control the power of the level optical signal.

35. An apparatus according to claim 34, wherein each feedback loop further comprises:
an optical filter cancelling wavelength characteristics of the gain of the optical amplifier in the vicinity of the wavelength of the corresponding optical signal, to compensate for variations in the wavelength of the optical signal.

36. An apparatus according to claim 34, further comprising:
   an automatic level control (ALC) loop controlling the gain of the optical amplifier so that the optical output power of the optical amplifier coincides with a predetermined target.

37. An apparatus according to claim 36, further comprising:
   a detection device detecting the number of optical signals multiplexed into the WDM signal, wherein the ALC loop controls the gain of the optical amplifier in accordance with the number of the optical signals detected by the detection device.

38. An apparatus according to claim 37, wherein:
   the optical amplifier comprises an optical amplifying medium and a pump source pumping the optical amplifying medium, and
   the apparatus further comprises a pumping controller stopping pumping of the optical amplifying medium when the detected number of channels becomes zero.

39. An apparatus according to claim 33, wherein each feedback loop controls the power level of the corresponding output signal so that a tilt gain of the optical amplifier becomes flat.

40. An apparatus according to claim 39, wherein:
   the plurality of the optical signals comprise a first optical signal having a first wavelength, and a second optical signal having a second wavelength,
   the feedback loops comprise a first loop controlling the power level of the first optical signal to coincide with a first target, and a second loop controlling the power level of the second optical signal to coincide with a second target, and
   the first and second targets are set so that the gain of the optical amplifier at the first wavelength becomes equal to the gain of the optical amplifier at the second wavelength.

41. An apparatus according to claim 33, wherein the optical amplifier comprises:
   a doped fiber doped with a rare earth element, the doped fiber having a first end and a second end, the first end receiving the WDM signal; and
   a pump light source providing pump light to the doped fiber through at least one of the group consisting of the first end and the second end of the doped fiber.

42. An apparatus according to claim 41, wherein the optical amplifier has a gain band which includes 1.55 $\mu$m, and the rare earth element is erbium (ER).

43. An apparatus according to claim 33, further comprising:
   a plurality of optical transmitters producing the plurality of optical signals, respectively.

44. An apparatus according to claim 43, wherein comprises:
   an optical fiber transmission line receiving the amplified WDM signal from the optical amplifier; and
   a dispersion compensator compensating for dispersion occurring in the optical fiber transmission line.

45. An apparatus according to claim 44, wherein:
   the dispersion compensator comprises a plurality of dispersion compensating fibers corresponding, respectively, to the plurality of optical signals, each dispersion compensating fiber compensating for dispersion affecting the corresponding optical signal.

46. An apparatus according to claim 33, further comprises:
   an optical filter cancelling wavelength characteristics of the gain of the optical amplifier, to compensate for variations in power due to variations in wavelengths of the optical signals.

47. An optical amplifier according to claim 33, wherein each of the feedback loops includes an optical attenuator attenuating the corresponding optical signal.

48. An apparatus comprising:
   means for combining a plurality of optical signals into a wavelength division multiplexed (WDM) signal;
   means for amplifying the WDM signal; and
   means for independently controlling a power level of each optical signal in accordance with a portion of the optical signal branched therefrom before the optical signal is combined by said means for combining.

49. A method comprising the steps of:
   combining a plurality of optical signals into a wavelength division multiplexed (WDM) signal;
   amplifying the WDM signal; and
   independently controlling a power level of each optical signal in accordance with an amplification characteristic of the amplifying step and in accordance with a portion of the optical signal branched therefrom before being combined into the WDM signal.

50. A method according to claim 49, wherein the step of independently controlling controls the power level of each optical signal so that a tilt gain of the amplifying step becomes flat.

51. An apparatus comprising:
   a combiner combining a plurality of optical signals into a wavelength division multiplexed (WDM) signal;
   an amplifier amplifying the WDM signal; and
   a controller independently controlling a power level of each optical signal in accordance with an amplification characteristic of the amplifier and in accordance with a portion of the optical signal branched therefrom before being combined by the combiner.

52. An apparatus according to claim 51, wherein the controller controls the power level of each optical signal so that a tilt gain of the optical amplifier becomes flat.

53. An apparatus comprising:
   a combiner combining a plurality of optical signals into a wavelength division multiplexed (WDM) signal;
   an amplifier amplifying the WDM signal; and
   a controller controlling a power level of each optical signal before being combined into the WDM signal, in accordance with an amplification characteristic of the amplifier and in accordance with a portion of the optical signal branched therefrom before the optical signal is combined by the combiner into the WDM signal.

54. A method comprising:
   combining a plurality of optical signals into a wavelength division multiplexed (WDM) signal;
   amplifying the WDM signal with an amplifier; and
   controlling a power level of each optical signal before being combined into the WDM signal, in accordance with an amplification characteristic of the amplifier and in accordance with a portion of the optical signal branched therefrom before the optical signal is combined into the WDM signal.

55. An apparatus comprising:
   a plurality of branching devices corresponding, respectively, to a plurality of optical signals having different wavelengths, each branching device branching a portion of the corresponding optical signal;

a plurality of feedback loops corresponding, respectively, to the plurality of optical signals, each feedback loop controlling the power level of the corresponding optical signal in accordance with the portion branched from the optical signal;

an optical multiplexer multiplexing the plurality of power level controlled optical signals having the portions branched therefrom into a wavelength division multiplexed (WDM) signal; and an optical amplifier amplifying the WDM signal.

56. A method comprising:

branching a portion of each optical signal of a plurality of optical signals having different wavelengths;

controlling the power level of each optical signal in accordance with the portion branched from the optical signal;

combining the power level controlled optical signals having the portions branched therefrom into a wavelength division multiplexed (WDM) signal; and amplifying the WDM signal.

* * * * *

UNITED STATES PATENT AND TRADEMARK OFFICE
CERTIFICATE OF CORRECTION

PATENT NO.: 6,031,659
DATED : February 29, 2000
INVENTOR(S): Katsuhiko NISHIKAWA It is certified that errors appear in the above-identified patent and that said Letters Patent is hereby corrected as shown below:

Col. 12, line 59, after "power" insert --level--.
      line 60, delete "level".

Col. 13, line 48, change "(ER)" to --(Er)--.
      line 53, change "wherein comprises" to --further comprising--.
      lines 66-67, change "comprises" to --comprising--.

Signed and Sealed this

Third Day of April, 2001

Attest:

NICHOLAS P. GODICI

Attesting Officer      Acting Director of the United States Patent and Trademark Office

UNITED STATES PATENT AND TRADEMARK OFFICE
CERTIFICATE OF CORRECTION

PATENT NO. : 6,031,659
DATED : February 29, 2000
INVENTOR(S) : Tadashi Okiyama

It is certified that error appears in the above-identified patent and that said Letters Patent is hereby corrected as shown below:

Column 12,
Line 59, after "power" insert -- level --.
Line 60, delete "level".

Column 13,
Line 48, change "(ER)" to -- (Er) --.
Line 53, change "wherein comprises" to -- further comprising --.
Lines 66-67, change "comprises" to -- comprising --.

Signed and Sealed this

Tenth Day of December, 2002

JAMES E. ROGAN
*Director of the United States Patent and Trademark Office*